Oct. 26, 1965  T. A. FLANDERS  3,214,130
VALVE
Filed March 5, 1962
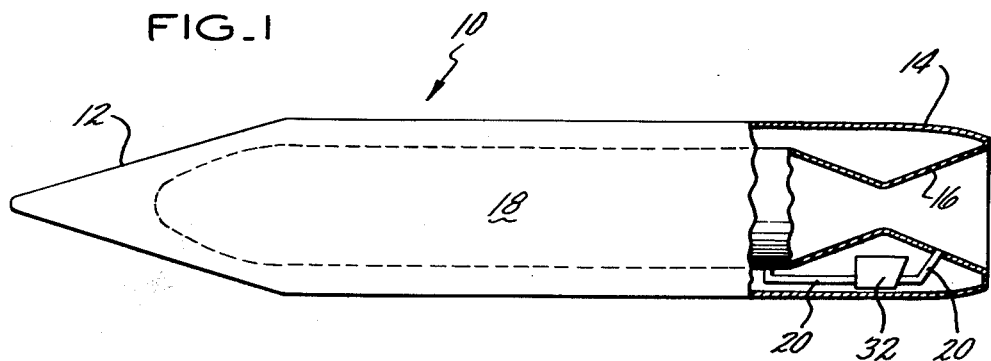
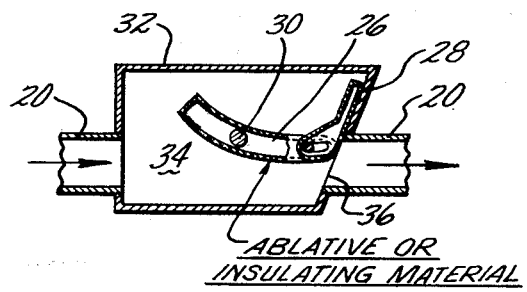
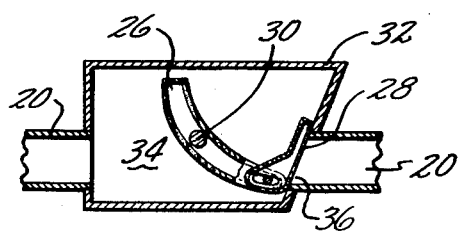
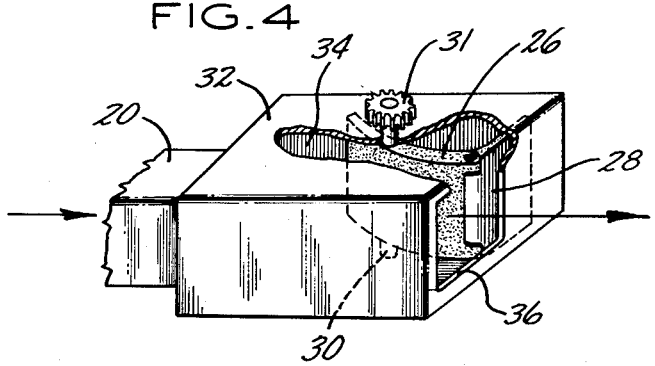
INVENTOR
THEODORE A. FLANDERS
BY *Norman Friedland*
AGENT

United States Patent Office 3,214,130
Patented Oct. 26, 1965

3,214,130
VALVE
Theodore A. Flanders, Windsor, Conn., assignor to United
Aircraft Corporation, East Hartford, Conn., a corporation of Delaware
Filed Mar. 5, 1962, Ser. No. 177,552
7 Claims. (Cl. 251—121)

This invention relates to valve construction and particularly to a valve forming a specific geometric nozzle shape and adapted to be used in an extremely hot temperature and high pressure environment.

As is exemplified in Patent No. 2,943,821 issued to A. E. Wetherbee, Jr., hot gases generated in the combustion chamber of a rocket motor can be used to control the direction of the rocket vehicle. This is generally referred to in the art as thrust vector control.

As is generally well known, to accomplish thrust vector control by fluid injection it is necessary to create an oblique shock wave somewhere within the nozzle of the rocket motor. One way of creating the shock wave is by injecting the products of combustion from the combustion chamber into the rocket discharge nozzle. It is somewhat important to regulate the hot gases so that its velocity, at the point of entry in the rocket nozzle, will be equivalent to or in excess of the speed of sound or Mach I. It is also important that these injecting hot gases evidence as small a pressure loss as possible so that the discharged hot gases will contribute to the overall thrust of the rocket motor.

A major problem in thrust vector control for a rocket motor utilizing solid propellants arises because the combustion products generated by the solid propellant generally exhibit extremely high temperatures and pressures. The materials for valve construction use heretofore known are incapable of withstanding such temperatures. Moreover, due to the high pressures acting on the valve mechanism, extremely large actuating mechanism would be required. A method of utilizing existing materials is to coat the exposed surfaces of the valve mechanism with either an ablative material or an insulating material. When the ablative material comes in contact with the gases, the ablative material liquifies, generally referred to as ablating which induces a cooling effect on the coated material. When the insulating material comes into contact with the hot combustion products, it chars, ultimately flakes off and erodes. However, since ablating and charring result in the dissipation of the outer material of the valve mechanism, its size will be altered so that, with existing known valves, leakage problems would be prevalent, particularly when the valve remains in a closed position.

Accordingly, it is the purpose of this invention to provide valve structure which is capable of withstanding the excessively high temperature by utilizing an ablative material yet prevent leakage when the valve is in the closed position.

As mentioned above, the extremely high pressures created by the combustion products which are utilized for thrust vector control would in the heretofore known valves require a large actuation force to position the valve. In the present invention it is a feature to construct the valve in such a manner that the forces created by the combustion products substantially balance loads on the shaft and hence minimize friction so that a relatively small actuator may be utilized. It is, therefore, another feature of this invention to provide in a valve construction as described, means for pressure balancing the valve mechanism.

It still is another feature of this invention to provide in a valve construction as described a generally shaped variable area convergent-divergent nozzle.

By changing the area of the injecting nozzle, the flow of the discharging hot gases can be made to change so as to control the strength of the oblique shock, and hence control the magnitude of the thrust vector deflection.

Other features and advantages will be apparent from the specification and claims and from the accompanying drawings which illustrate an embodiment of the invention.

FIGURE 1 is a schematic illustration showing an environment for which this invention may be employed.

FIGURE 2 is a schematic illustration, in section, showing the valve in its open position.

FIGURE 3 is a schematic illustration showing the valve in a closed position.

FIGURE 4 is a perspective view of the invention.

Now referring to the FIGURE 1 showing a rocket vehicle comprising a solid propellant rocket motor generally indicated by numeral 10 and having a forward end 12 and rearward end 14. The rearward end contains a convergent-divergent nozzle 16 through which the hot gases generated in the combustion chamber 18 pass. A bypass or branch line 20 diverts a portion of the combustion products away from the throat of the rocket nozzle and has its opened end terminating in the proximity thereto. It is to be understood that the point in which and the angle in which the bypass line enters the nozzle area will principally depend on the particular rocket motor and the particular design configuration for the thrust vector control. For more details of thrust vectoring control, reference is hereby made to the above-referred-to Patent No. 2,943,821.

Although the valve is shown in schematic form, it is to be understood that the details of construction may be of the conventional type, and in the interest of clarity, will not be specifically described but it should be appreciated that the valve may employ adequate sealing and bearing means for sealing and supporting the valve shaft as required. The materials contemplated for constructing the hardware are those that are known to withstand high temperatures and pressures and yet in the realm of economical feasibility. The valve mechanism may be maintained at a reasonable temperature with an ablative or insulating material such as pyrolitic graphite, graphite and asbestos phenolics. As shown in FIGURES 2 through 4, the valve basically comprises a two-pieced hinged arrangement formed by the contoured linkage member 26 and valve shutoff or seal plate member 28, disposed in valve housing 32. Conventional connecting joints for coupling the housing to the bypass line 20 may be used. The shutoff plate 28 may be rotatably secured to the contoured linkage member 26 in any well-known manner such as the trunnion arrangement shown in the drawing. Linkage member 26 is secured to shaft 30 which carries gear member 31 for imparting rotary movement thereto.

It will be appreciated that the hot gases generated in the combustion chamber will pass through line 20 into chamber 34. Since the hot gases completely fill the volume of the chamber the pressure exerted on the rotary members will counter balance each other, so that the pressure loading felt by shaft 30 will be substantially minimized. In this manner, the force required to actuate opening and closing of the seal plate 28 will be held to a minimum. The gases behind seal plate 28 hold it in the position shown in the drawings. It also will be appreciated that the valve overlaps the opening 36 formed in valve housing 32 so that when the ablative coating has dissipated the valve will remain sufficiently large to maintain the valve closed.

As noted in the drawings, contoured linkage member 26 is formed in the shape of a partial convergent-divergent nozzle. The member cooperates with the inner wall of the valve housing to define the nozzle area. The inner wall may likewise be shaped to give a definitive nozzle shape. It will be appreciated that actual throttling of the hot gases is controlled by the contoured linkage member 26 and not the area formed by the seal plate 28 and opening 36. In this manner the flow of fluid and hence strength of oblique shock can be effectively controlled. Since the fluid passes through a generally shaped convergent and divergent nozzle rather than the straight edge opening as would be the case if the throttle took place by virtue of seal plate 28, a high degree of pressure recovery will be realized.

What has been described is a novel valve construction which is characterized by being relatively simple to construct, allowing the use of an ablative or insulating coating without destroying sealing characteristics, having a pressure balancing valve body for minimizing friction and yet being capable of rugged use. The valve body is constructed to define a particularly shaped pressure recovery nozzle for limiting the pressure losses of the fluid passing therethrough so that fluid may be utilized for imparting a thrust component to a rocket vehicle.

It is to be understood that the invention is not limited to the specific embodiment herein illustrated and described, but may be used in other ways without departing from its spirit as defined by the following claims:

I claim:
1. A valve construction comprising a housing having an inlet opening and an outlet opening, a rotatable shaft supported by the housing, a valve body in said housing having first plate mounted adjacent an inner wall of said housing and together defining a variable area nozzle, a second plate cooperating with the outlet opening in the housing for shutting off the flow therethrough, means for hingedly connecting the first plate to said second plate, said first plate having a top and bottom surface both of which are subjected to the fluid admitted into said housing, and means for imparting rotary movement to the first plate so that fluid admitted into said housing passes through said nozzle and acts against said second plate for urging said second plate toward said opening.

2. A valve comprising a housing defining a chamber, a rotatable contoured member supported in the chamber, said member having a first surface cooperating with the adjacent inner surface of the side wall of said housing to define a nozzle, a second surface formed on the contoured member and coextensive with the first surface subjected to fluid admitted into said chamber, a flat plate rotatably secured to said contoured member and disposed in said chamber to overlie an outlet opening formed in said housing for shutting off the flow of fluid through the valve, and means for imparting rotary movement to said contoured member for varying the area of the nozzle.

3. A valve as defined in claim 2 wherein said nozzle defines a convergent-divergent restriction.

4. A valve comprising a housing having an inlet and outlet, a chamber formed by said housing, a contoured member disposed in said chamber and having a surface cooperating with an adjacent inner wall of said housing for defining a variable area nozzle, a shaft rotatably supporting said contoured member to said housing, a flat plate rotatably supported to one end of said contoured member and overlying the outlet formed in said housing, said flat plate radially extending away from the variable area nozzle so that the nozzle restricts fluid independent of the position of said flat plate, means for imparting rotary movement to said shaft.

5. A valve as claimed in claim 2 wherein said contoured member and plate member are coated with an ablative material.

6. A valve as claimed in claim 2 wherein said contoured member and plate member are coated with an insulated material.

7. A valve as claimed in claim 2 wherein the flat plate member is angularly disposed relative to said contoured member.

References Cited by the Examiner

UNITED STATES PATENTS

| 2,025,665 | 12/35 | Dickinson | 251—228 |
| 2,443,036 | 6/48 | Hopkins | 251—228 |
| 2,742,055 | 4/56 | Seewer | 251—118 |
| 3,001,473 | 9/61 | Shepheard | 102—92.5 |
| 3,022,190 | 2/62 | Feldman | 102—92.5 |
| 3,036,430 | 5/62 | Eggers | 60—35.54 |

FOREIGN PATENTS 410,027  2/25  Germany.

M. CARY NELSON, *Primary Examiner.*

ISADOR WEIL, *Examiner.*